(12) United States Patent
Nakaya

(10) Patent No.: US 10,718,481 B2
(45) Date of Patent: Jul. 21, 2020

(54) VEHICULAR ILLUMINATION DEVICE

(71) Applicant: MAZDA MOTOR CORPORATION, Hiroshima (JP)

(72) Inventor: Yoshiaki Nakaya, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 16/523,466

(22) Filed: Jul. 26, 2019

(65) Prior Publication Data

US 2020/0041092 A1 Feb. 6, 2020

(30) Foreign Application Priority Data

Aug. 6, 2018 (JP) ................................ 2018-147457

(51) Int. Cl.
*F21V 21/00* (2006.01)
*F21S 41/24* (2018.01)
*F21S 41/20* (2018.01)
*F21W 121/00* (2006.01)

(52) U.S. Cl.
CPC .............. *F21S 41/24* (2018.01); *F21S 41/28* (2018.01); *F21W 2121/00* (2013.01)

(58) Field of Classification Search
CPC ....... F21S 41/24; F21S 41/28; F21W 2121/00
USPC ........................................................ 362/511
See application file for complete search history.

(56) References Cited

U.S. PATENT DOCUMENTS

| | | | |
|---|---|---|---|
| 6,107,916 A * | 8/2000 | Beck ................... | B60Q 1/0041 340/468 |
| 7,097,336 B2 * | 8/2006 | Lin ...................... | B60Q 1/0052 362/249.14 |
| 8,066,416 B2 * | 11/2011 | Bucher ................ | B60Q 1/0052 362/511 |
| 9,651,212 B1 | 5/2017 | Wasilewski et al. | |
| 2006/0067086 A1 * | 3/2006 | Hsu ..................... | B60Q 1/0052 362/544 |
| 2012/0069592 A1 * | 3/2012 | Natsume .............. | B60Q 1/0052 362/511 |
| 2017/0261168 A1 * | 9/2017 | Edletzberger .......... | F21S 43/27 |

(Continued)

FOREIGN PATENT DOCUMENTS

EP 0900694 A2 3/1999
GB 2535758 A 8/2016

(Continued)

OTHER PUBLICATIONS

Extended European Search Report issued by the European Patent Office dated Sep. 30, 2019, which corresponds to EP19188576.3-1012 and is related to U.S. Appl. No. 16/523,466.

*Primary Examiner* — Laura K Tso

(74) *Attorney, Agent, or Firm* — Studebaker & Brackett PC

(57) ABSTRACT

Provided is a vehicular illumination device capable of increasing a degree of design freedom in designing a vehicle having enhanced design. An illumination device is provided on a front portion of a vehicle. The illumination device includes a headlight, a light guide, and an outer glass. The light guide has an annular shape in such a way as to surround a periphery of the headlight. The outer glass includes a front surface portion for covering a front surface of the headlight, and a perimeter portion for covering a periphery of the headlight. The light guide is disposed along an imaginary plane inclined with respect to a tubular axis of the perimeter portion.

8 Claims, 10 Drawing Sheets

(56) References Cited

U.S. PATENT DOCUMENTS

| | | | |
|---|---|---|---|
| 2018/0236926 A1 | 8/2018 | Lee et al. | |
| 2019/0249839 A1* | 8/2019 | Childress | F21S 41/141 |
| 2020/0041091 A1* | 2/2020 | Nakaya | F21S 41/28 |

FOREIGN PATENT DOCUMENTS

| | | |
|---|---|---|
| JP | 2014-164975 A | 9/2014 |
| JP | 2015-133219 A | 7/2015 |
| JP | 2016-091846 A | 5/2016 |
| JP | 2018-032512 A | 3/2018 |
| JP | 2018-113133 A | 7/2018 |

* cited by examiner

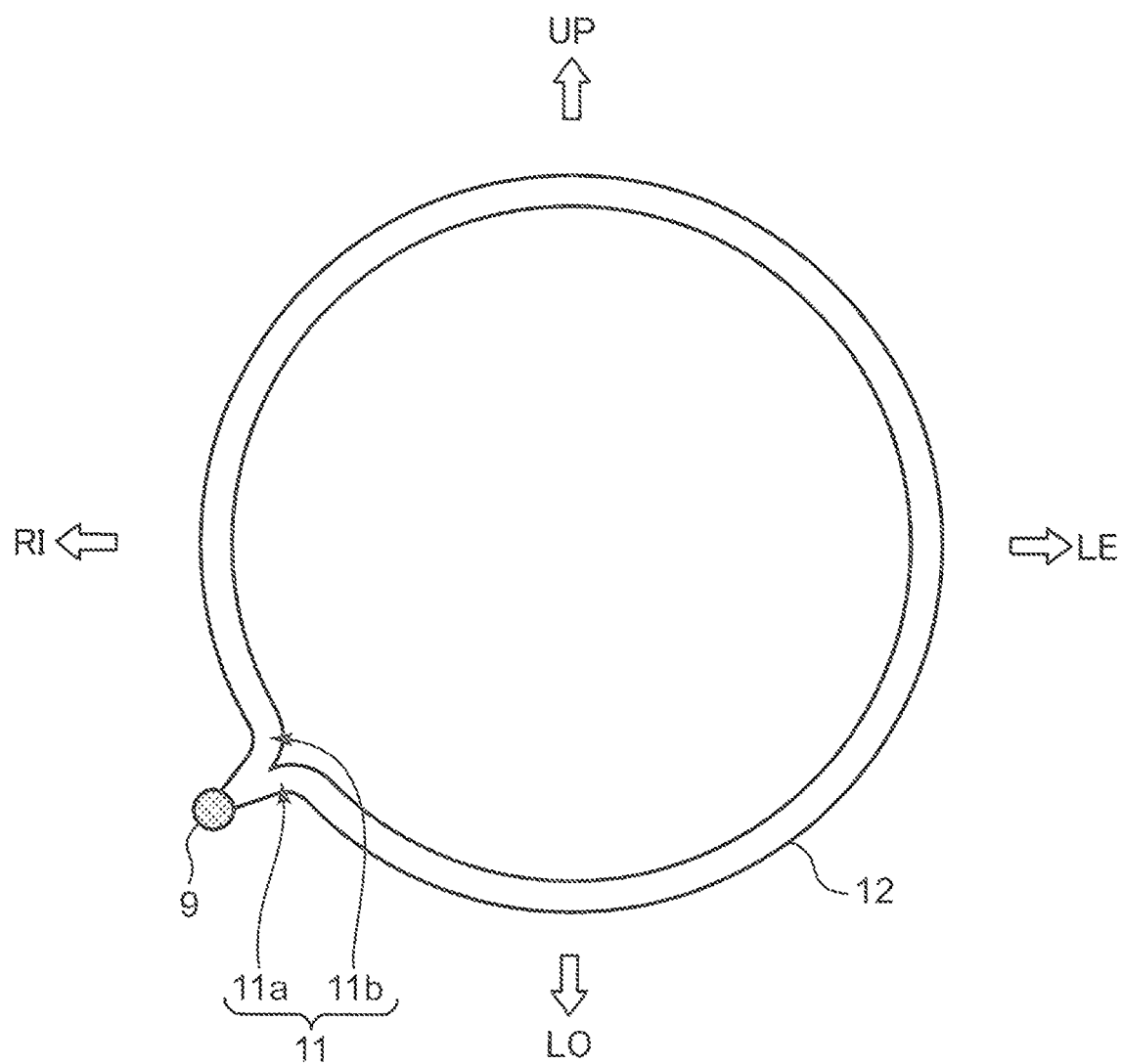

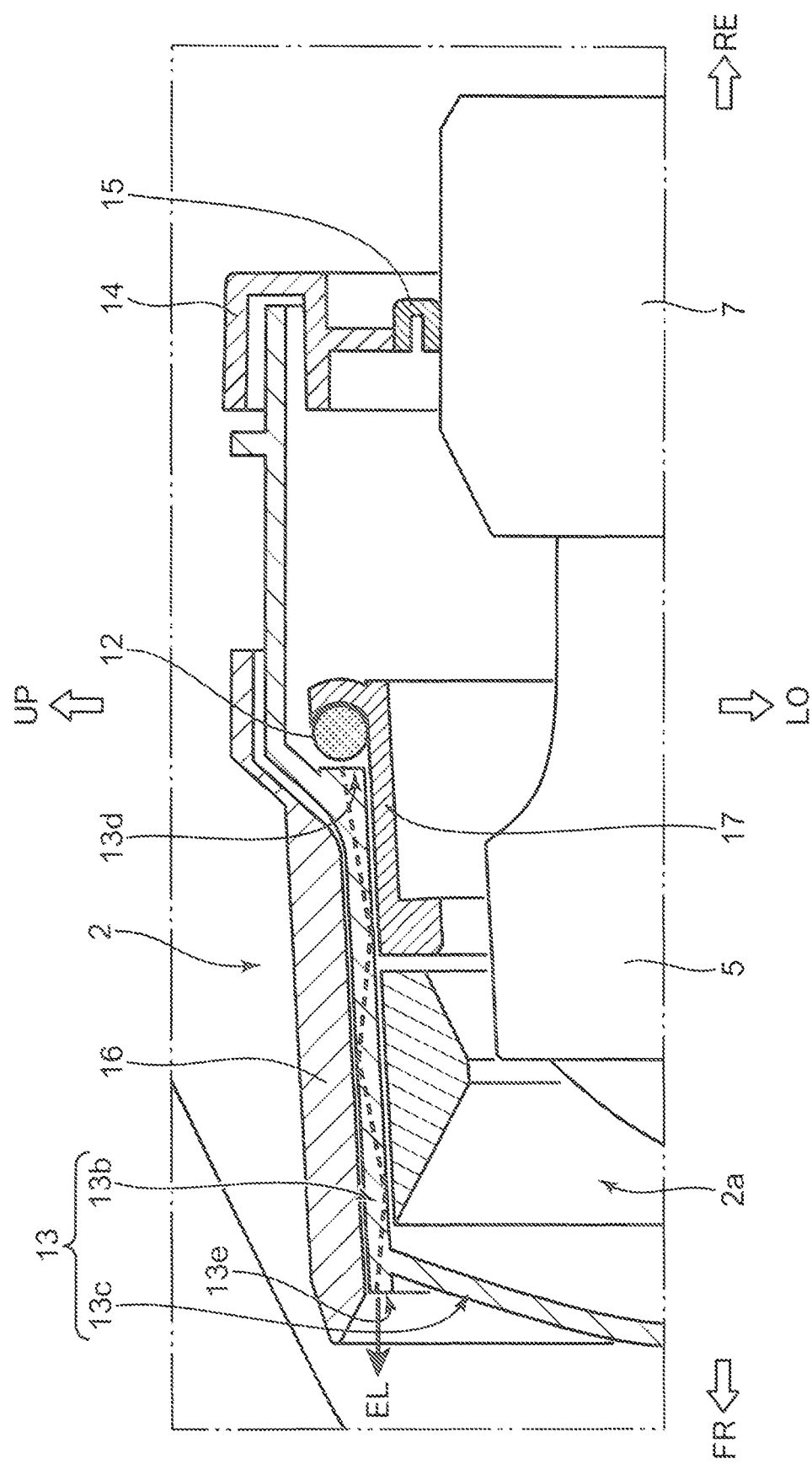

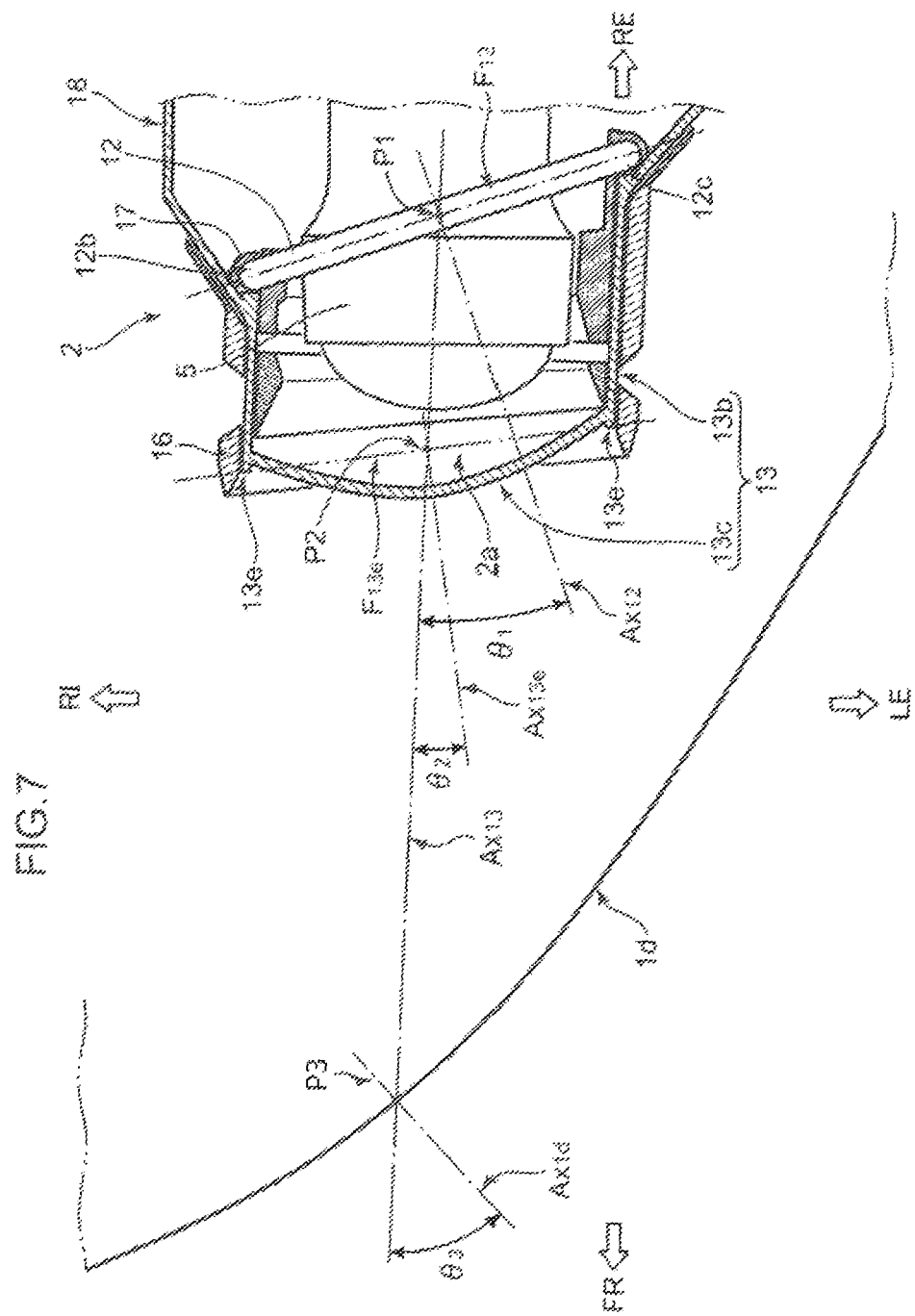

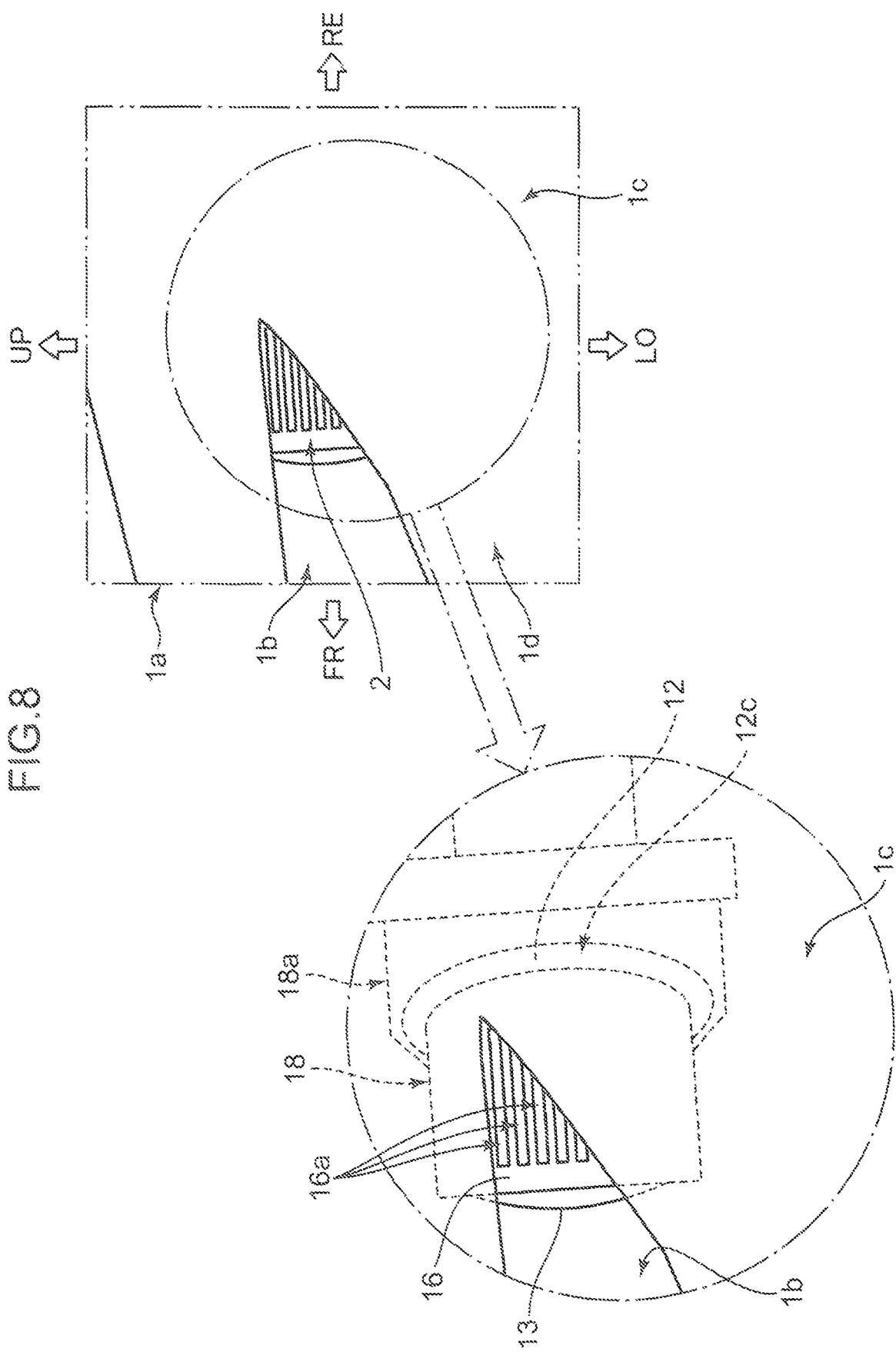

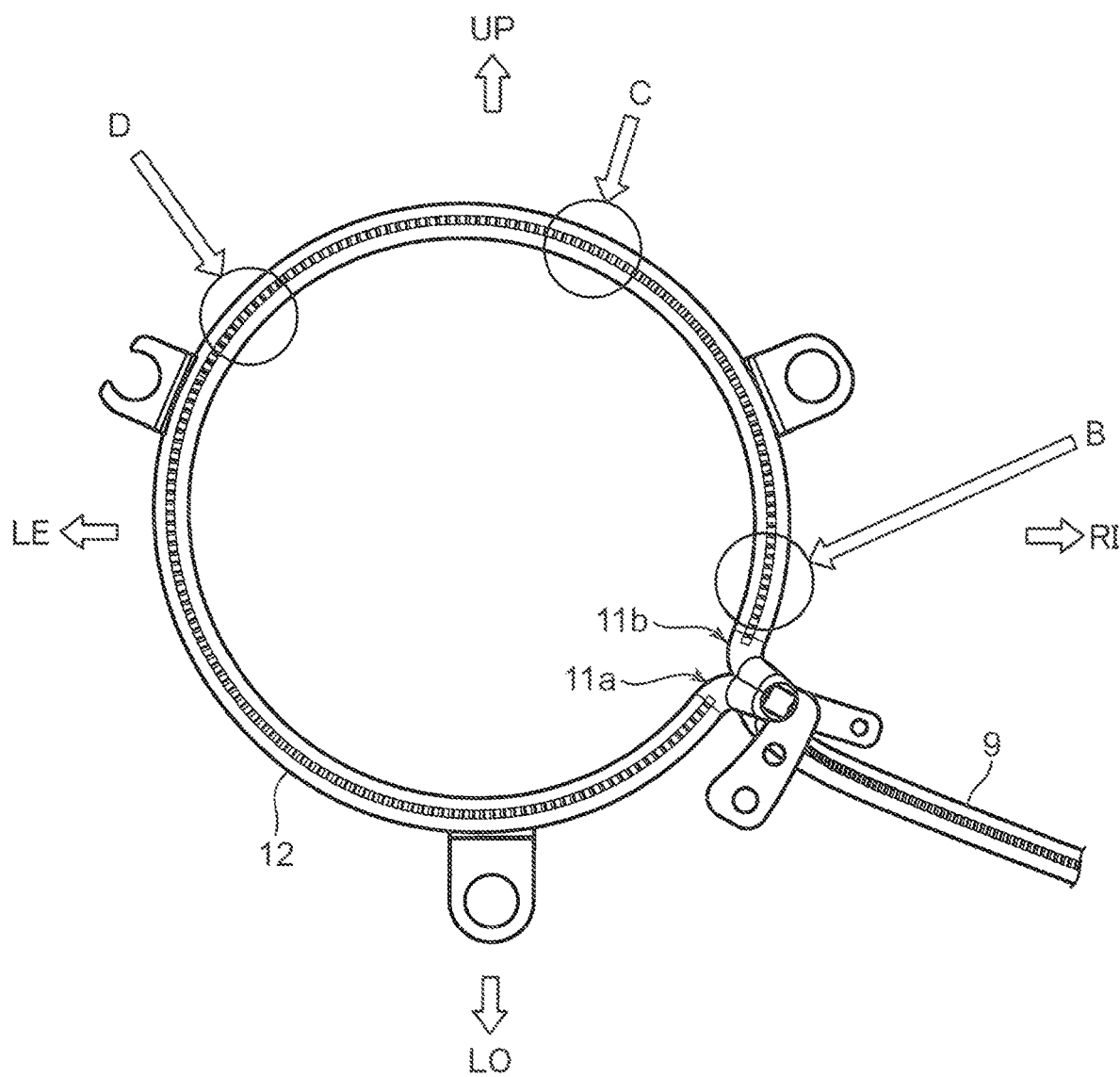

VEHICULAR ILLUMINATION DEVICE

FIELD OF THE INVENTION

The present invention relates to a vehicular illumination device, and more particularly relates to an illumination device provided on a front portion of a vehicle, and including a headlight and a light emitting portion mounted on the headlight.

DESCRIPTION OF RELATED ART

In a vehicle such as an automobile, a headlight is disposed on a front portion of the vehicle. In recent years, a vehicle in which a plurality of light emitting portions are mounted on a headlight has been developed.

For example, Japanese Unexamined Patent Application Publication No. 2018-32512 discloses an illumination device in which a headlight and a daytime running lamp mounted on the headlight are accommodated inside a housing. The illumination device disclosed in Japanese Unexamined Patent Application Publication No. 2018-32512 is configured such that a daytime running lamp includes a rod-shaped light guide and a light source for outputting light to the light guide.

In the illumination device disclosed in Japanese Unexamined Patent Application Publication No. 2018-32512, a rod-shaped light guide is disposed inside a housing in a direction along a width direction of a vehicle.

However, in the illumination device disclosed in Japanese Unexamined Patent Application Publication No. 2018-32512, there is room for improvement in terms of a degree of design freedom in designing a vehicle having enhanced design. Specifically, in the illumination device disclosed in Japanese Unexamined Patent Application Publication No. 2018-32512, a light guide inside a housing is visible from outside. Thus, a light guide disposed inside a housing is made visible, and there is room for improvement in designing a vehicle having enhanced design.

An object of the present invention is to provide a vehicular illumination device capable of increasing a degree of design freedom in designing a vehicle having enhanced design.

SUMMARY OF THE INVENTION

A vehicular illumination device according to the present invention is a vehicular illumination device provided on a front portion of a vehicle. The illumination device includes: a headlight as a first light source portion operative to radiate light forwardly of the vehicle; an outer glass including a front surface portion for covering a front portion of the headlight and a tubular-shaped perimeter portion for covering a periphery of the headlight; a second light source portion provided separately of the headlight; and a light guide having an annular shape in such a way as to surround a periphery of the headlight, and configured to allow incidence of light output from the second light source portion and output the incident light while guiding the incident light. The light guide is disposed along an imaginary plane inclined with respect to a tubular axis of the perimeter portion of the outer glass.

BRIEF DESCRIPTION OF THE DRAWINGS

FIG. 5 is a schematic front view illustrating a configuration of a light guide disposed to surround a periphery of a headlight.

FIG. 6 is a schematic cross-sectional view illustrating a light path of light output from an annular-shaped light guide.

FIG. 7 is a diagram illustrating a part of a VII-VII section in FIG. 2, and is a schematic cross-sectional view illustrating a posture of the annular-shaped light guide inside a light chamber.

FIG. 8 is a schematic side view of a vehicular front portion, when viewed from a side of the vehicle.

FIG. 9 is a schematic rear view illustrating a configuration of the annular-shaped light guide.

DETAILED DESCRIPTION OF THE EMBODIMENT

Figure 1:
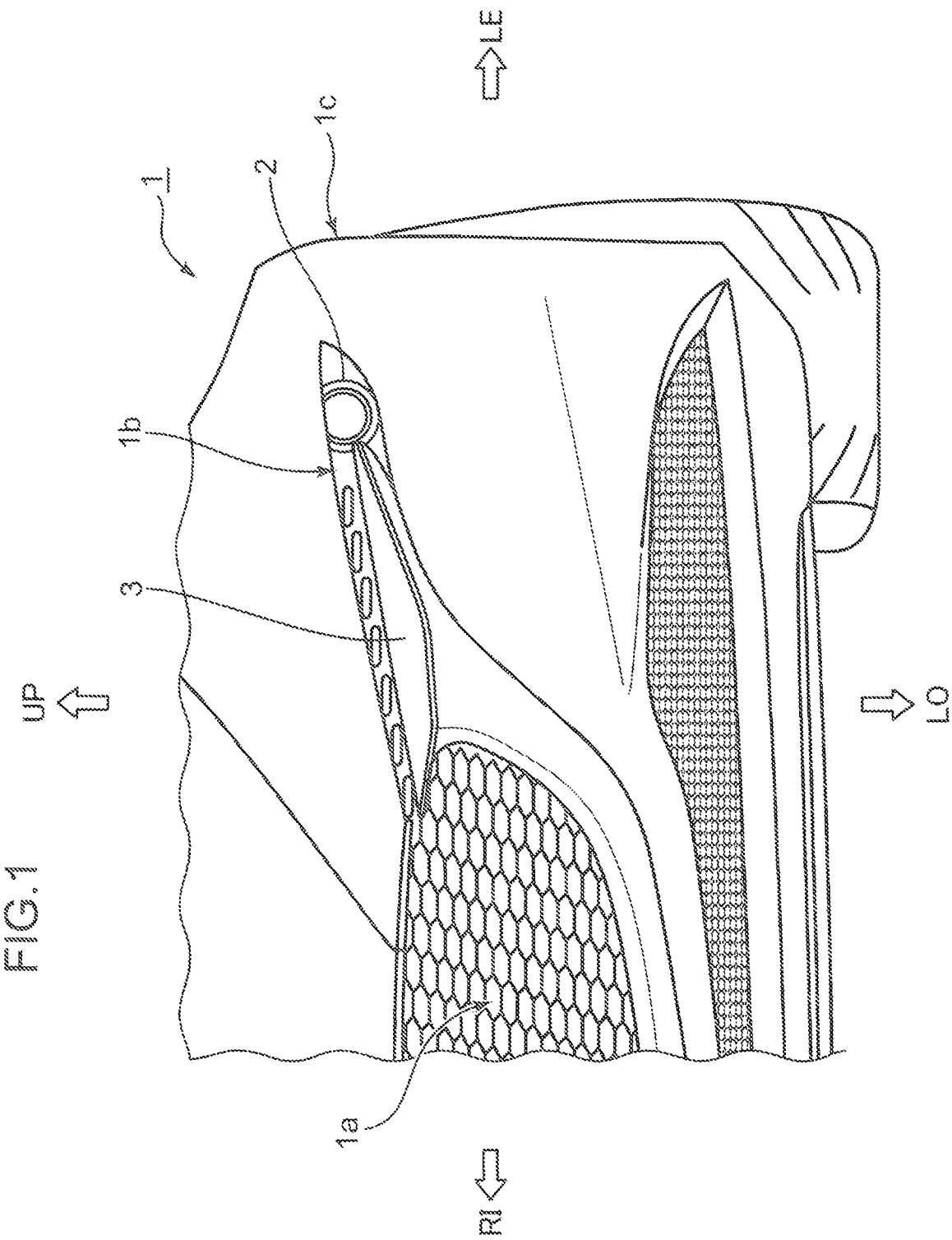
FIG. 1 is a schematic front view illustrating a configuration of a front portion of a vehicle according to an embodiment.

In the following, an embodiment of the present invention is described with reference to the drawings. Note that an embodiment described in the following is an example of the present invention. The present invention is not limited to the following embodiment except for an essential configuration thereof.

Note that, in the drawings to be referred to in the following description, "FR" denotes a front side of a vehicle (a traveling direction), "RE" denotes a rear side of the vehicle, "LE" denotes a left side of the vehicle, "RI" denotes a right side of the vehicle, "UP" denotes an upper side of the vehicle, and "LO" denotes a lower side of the vehicle.

Embodiment

1. Configuration of Vehicular Front Portion 1a

A configuration of a vehicular front portion 1a of a vehicle 1 according to an embodiment is described with reference to FIG. 1.

As illustrated in FIG. 1, a recess portion 1b recessed rearwardly of the vehicle 1 is formed in an end portion (in FIG. 1, a left side portion) of the vehicular front portion 1a of the vehicle 1 in a vehicle width direction. The recess portion 1b has an elongated shape in a lateral direction from a middle portion of the vehicle 1 in a vehicle width direction toward a vehicular side portion 1c in a front view when viewed from a front side of the vehicle 1.

An illumination device 2 and a signature wing (a registered trademark of Mazda Motor Corporation) 3 are disposed in a rear portion of the recess portion 1b (a portion on the rear side on the plane of FIG. 1).

The signature wing 3 is an exterior member (a garnish) for decorating the vehicular front portion 1a of the vehicle 1. The signature wing 3 exhibits a high decorative effect not only in a daytime but also in a nighttime by causing a wing light emitting portion 4 to be described later and incorporated in the signature wing 3 to emit light. Specifically, the signature wing 3 in the present embodiment corresponds to an exterior member.

The signature wing 3 includes a plate-shaped wing portion extending with a small width along the recess portion 1b. Further, the signature wing 3 is formed to extend from the rear side of the recess portion 1b outwardly (forwardly of the vehicle 1).

2. Layout Configuration of Illumination Device 2 and Signature Wing 3

Figure 2:
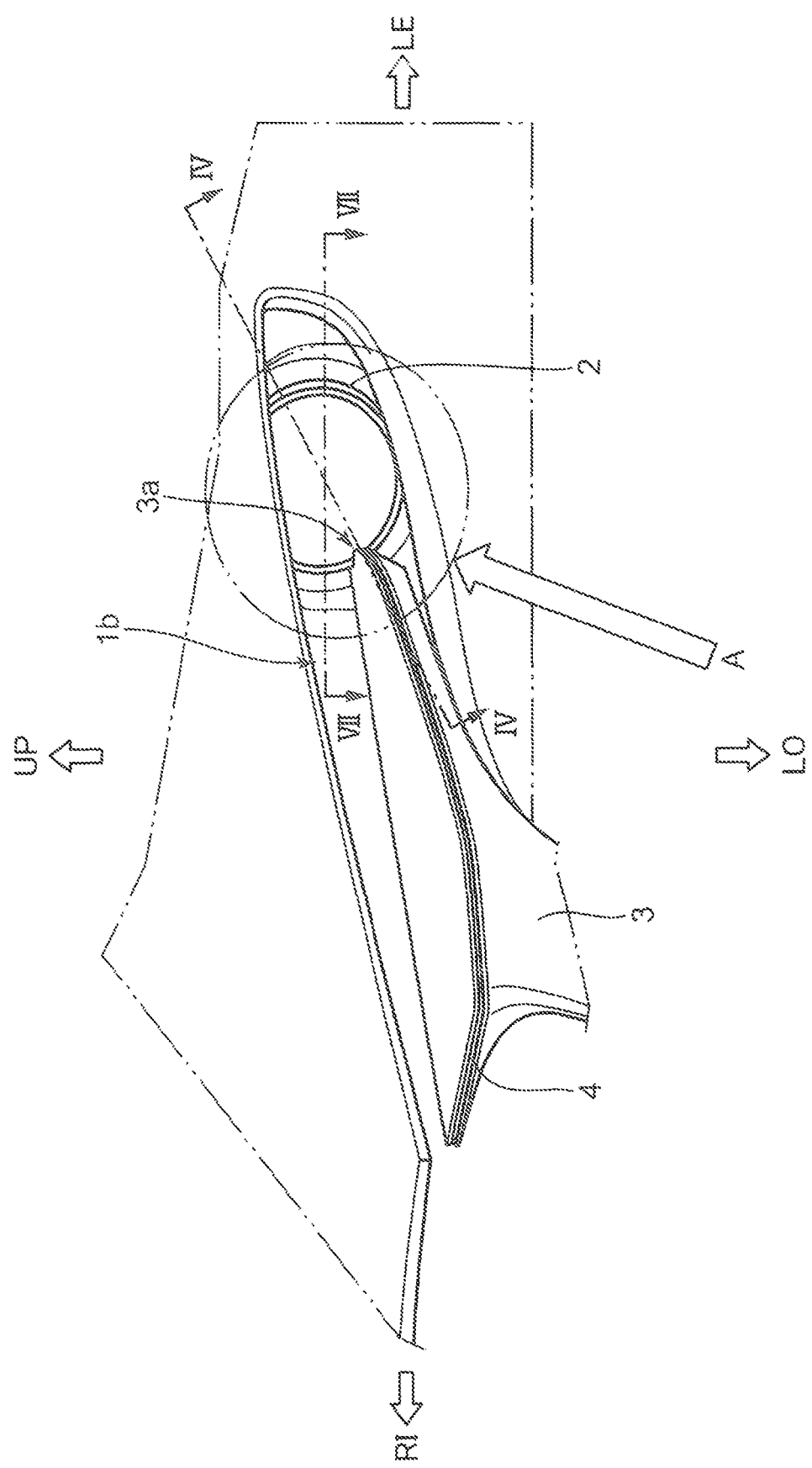
FIG. 2 is a schematic front view illustrating a layout relationship between an illumination device and a signature wing.
Figure 3:
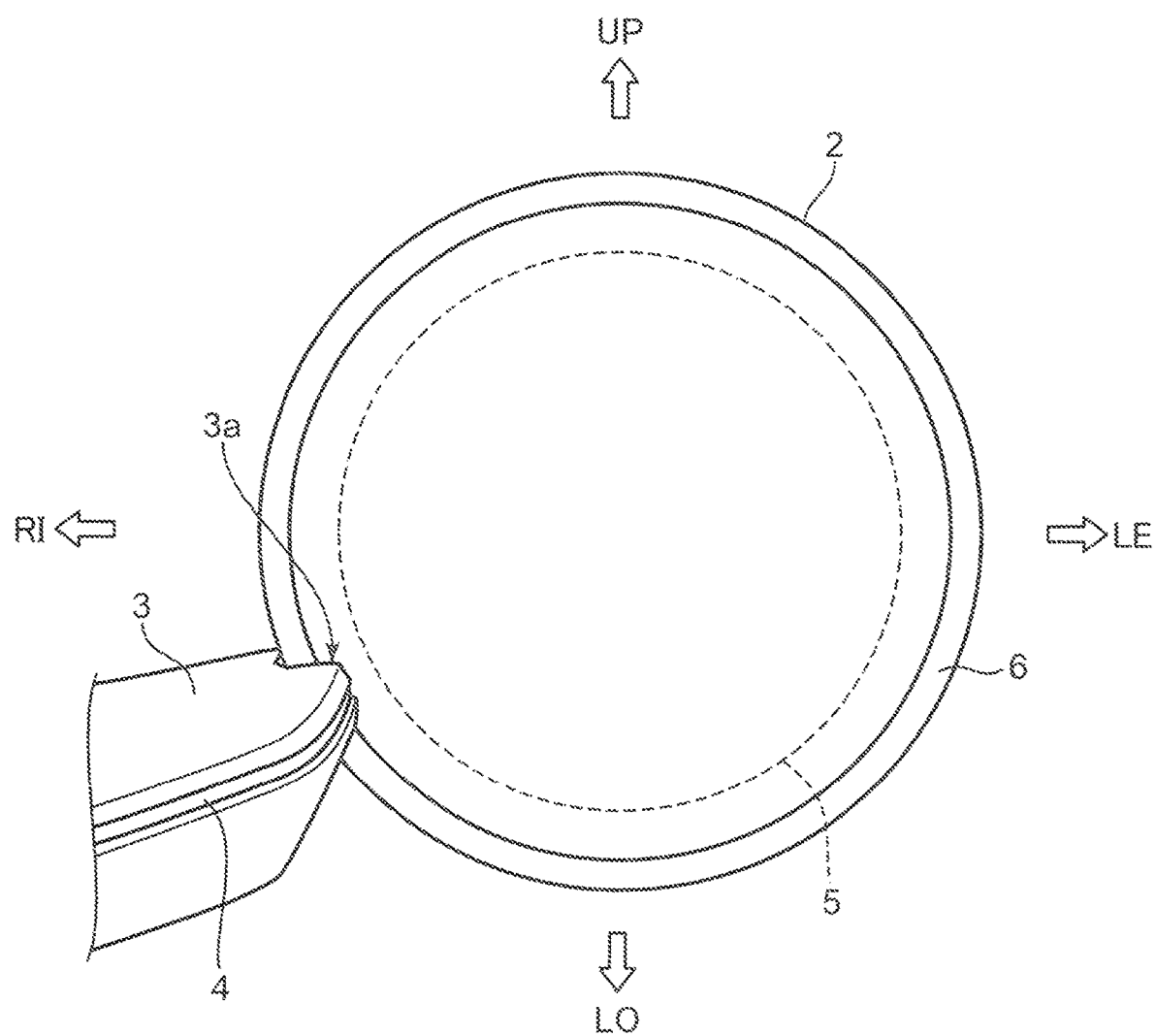
FIG. 3 is a schematic diagram schematically and enlargedly illustrating a portion A in FIG. 2.

A layout configuration of the illumination device 2 and the signature wing 3 is described with reference to FIGS. 2 and 3. FIG. 2 is a schematic front view illustrating a layout configuration of the illumination device 2 and the signature wing 3. FIG. 3 is a schematic diagram schematically and enlargedly illustrating a portion A in FIG. 2.

As illustrated in FIG. 3, the illumination device 2 according to the present embodiment includes a headlight 5 as a first light source portion, and an annular light emitting portion 6 and the wing light emitting portion 4. Further, as illustrated in FIGS. 2 and 3, a part of a circumference of the annular light emitting portion 6 is covered by a distal end portion 3a of the signature wing 3 from the front side.

The headlight 5 has a substantially circular shape in a front view as an external appearance. The annular light emitting portion 6 is formed into an annular shape in such a way as to surround an outer circumference of the headlight 5 in a front view.

On the other hand, the wing light emitting portion 4 is formed along a front end portion (a peak portion protruding most forwardly of the vehicle 1) of the signature wing 3.

Note that each of the annular light emitting portion 5 and the wing light emitting portion 4 in the present embodiment corresponds to a light emitting portion mounted on the headlight 5.

3. Internal Configuration of Illumination Device 2

Figure 4:
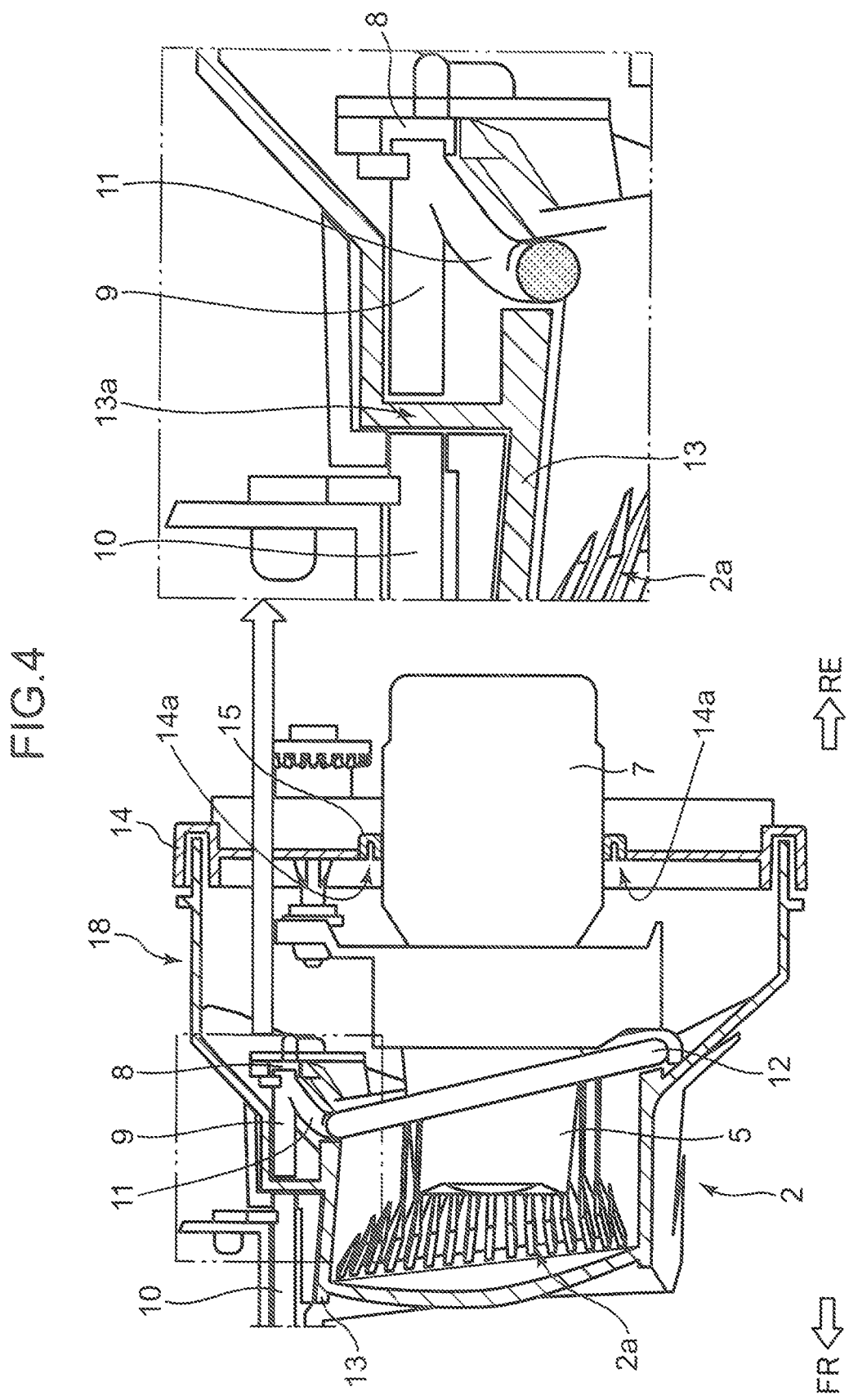
FIG. 4 is a diagram illustrating a IV-IV section in FIG. 2, and is a schematic cross-sectional view illustrating an internal configuration of the illumination device.

An internal configuration of the illumination device 2 is described with reference to FIG. 4. FIG. 4 is a schematic cross-sectional view illustrating a IV-IV section in FIG. 2.

As illustrated in FIG. 4, the illumination device 2 includes the headlight 5 inside a light chamber 2a. A heat sink 7 for releasing heat generated when the headlight 5 is turned on to the outside is provided on a rear portion of the headlight 5. A part of the heat sink 7 extends rearwardly from the light chamber 2a.

The light chamber 2a is an internal space of a housing 18, which is constituted by combining an outer glass 13 and a back surface case 14. The outer glass 13 has a bottomed tubular shape, and covers a front surface and a side surface of the headlight 5. Note that the heat sink 7 extends rearwardly through an opening portion 14a formed in the back surface case 14. Note that the outer glass 13 may be a transparent or semi-transparent member, and is not limited to a member made of glass. Therefore, the outer glass 13 may be made of plastic.

Herein, a clearance between the back surface case 14 and the heat sink 7 is sealed by an elastically deformable seal member 15.

An annular-shaped light guide 12 is also disposed inside the light chamber 2a in such a way as to surround an outer circumference of the headlight 5. The light guide 12 corresponds to a first light guide. Further, a second light source portion 8 constituted by one or more semiconductor light emitting elements (e.g., LED chips), as a light source portion separately of the headlight 5 serving as a first light source portion, a linearly and forwardly extending light guide 9 disposed in contact with or proximate to the second light source portion 8, and a light guide 11 for connecting the light guide 9 and the light guide 12 are also disposed inside the light chamber 2a. The light guide 9 corresponds to a second light guide, and the light guide 11 corresponds to a third light guide.

As illustrated by an enlarged portion in FIG. 4, the illumination device 2 also includes a light guide 10. The light guide 10 corresponds to a fourth light guide, and includes an end surface facing an end surface of the light guide 9 in a state that an interposing portion 13a of the outer glass 13 is interposed between the light guides 9 and 10. A part of light from the second light source portion 8 is guided from the light guide 9 to the light guide 10 through the outer glass 13.

Herein, the annular light emitting portion 6 is constituted by the light guide 12, and the wing light emitting portion 4 is constituted by the light guide 10. The light guide 10 extends along a front end portion of the signature wing 3 in a vehicle width direction, and outputs light guided from the light guide 9 forwardly of the vehicle 1, while guiding the light along the front end portion of the signature wing 3.

4. Configuration of Light Guides 9, 11, and 12

A configuration of the light guides 9, 11, and 12 is described with reference to FIG. 5. FIG. 5 is a schematic front view illustrating a configuration of the light guides 9, 11, and 12.

As illustrated in FIG. 5, the light guide 11 is formed to be branched from (connected to) the light guide 9, which extends forwardly from the rear side of the illumination device 2.

The light guide 11 includes two branch portions 11a and 11b. One of the two branch portions 11a and 11b, namely, the first branch portion 11a is connected in such a way that light is guided to one side (a clockwise side) in a circumferential direction of the annular-shaped light guide 12.

On the other hand, the other of the two branch portions 11a and 11b, namely, the second branch portion 11b is connected in such a way that light is guided to the other side (a counterclockwise side) in the circumferential direction of the annular-shaped light guide 12.

Note that, as described above, a connecting portion between the light guide 9, and each of the first and second branch portions 11a and 11b, and a connecting portion of each of the first and second branch portions 11a and 11b with respect to the light guide 12 are covered by the distal end portion 3a of the signature wing 3 from a front side.

5. Light Emitting Pattern of Annular Light Emitting Portion 6

A light emitting pattern of the annular light emitting portion 6 is described with reference to FIG. 6. FIG. 6 is a schematic cross-sectional view illustrating a light path of light output from the light guide 12 forwardly.

As illustrated in FIG. 6, the light chamber 2a is defined by the bottomed tubular-shaped outer glass 13, which is acquired by integrally forming a perimeter portion 13b and a front surface portion 13c, the back surface case 14 joined to a rear end portion of the outer glass 13, and a seal portion 15 for closing a clearance between an inner periphery of the back surface case 14 and an outer periphery of the heat sink 7.

In the light chamber 2a, the light guide 12 is disposed in such a way as to surround a periphery of the headlight 5 in a state that the light guide 12 is spaced away from the headlight 5. The light guide 12 is supported by a guide support portion 17, which is formed along an inner portion of the perimeter portion 13b of the outer glass 13.

A part of an outer circumference of the perimeter portion 13b of the outer glass 13 is covered by an outer case 16. The outer circumferential part of the perimeter portion 13b of the outer glass 13, which is covered by the outer case 16, is a portion closer to a front side with respect to a portion where the light guide 12 is disposed inside the light chamber 2a.

Next, light guided through the light guide 12 is output forwardly from the entirety of the light guide 12 in a circumferential direction. Light output forwardly from the light guide 12 is guided to the perimeter portion 13b from an incident portion 13d of the outer glass 13, which faces the front side of the light guide 12.

As illustrated by the broken line, on an inner portion of the perimeter portion 13b of the outer glass 13, light is guided forwardly, while repeating reflection on a radially inner peripheral surface and a radially outer peripheral surface of the perimeter portion 13b. Further, the guided light (EL) is output forwardly of the vehicle 1 from an output portion 13e, which is a front end portion of the perimeter portion 13b of the outer glass 13.

As described above, in the illumination device 2 according to the present embodiment, light output from the second light source portion 8 as one light source portion is branched, and guided to the light guide 10 and the light guide 12, so that the light guide 10 and the light guide 12 are caused to emit light.

6. Posture of Light Guide 12 Inside Light Chamber 2a

A posture of the light guide 12 inside the light chamber 2a is described with reference to FIG. 7. FIG. 7 is a diagram illustrating a part of a VII-VII section in FIG. 2.

As illustrated in FIG. 7, in the illumination device 2 according to the present embodiment, the perimeter portion 13b of the outer glass 13 has a substantially tubular shape. In view of the above, it is assumed that a tubular axis of the perimeter portion 13b is $Ax_{13}$.

As illustrated in FIG. 7, in a top plan view, the annular-shaped light guide 12 is disposed along an imaginary plane (first imaginary plane) $F_{12}$, which is inclined with respect to the tubular axis $Ax_{13}$ of the perimeter portion 13b. In other words, when a normal line $Ax_{11}$ orthogonal to the imaginary plane $F_{12}$ is defined, based on an intersection point P1 with respect to the tubular axis $Ax_{13}$ within the imaginary plane $F_{12}$, which is inclined with respect to the tubular axis $Ax_{13}$, the tubular axis $Ax_{13}$ and the normal line $Ax_{11}$ intersect with each other with an angle $\theta_1$, which is an acute angle smaller than 90°. The light guide 12 disposed in this posture is configured such that a middle end portion 12b in a vehicle width direction is located at a position closer to the front side of the vehicle 1 with respect to a lateral end portion 12c in the vehicle width direction.

Next, the perimeter portion 13b and the front surface portion 13c of the outer glass 13 are integrally formed, and a front end portion of the perimeter portion 13b projects forwardly of the vehicle 1 with respect to a connecting portion between the perimeter portion 13b and the front surface portion 13c. Further, as described above, a front end portion of the perimeter portion 13b serves as the output portion 13e of light incident from the light guide 12.

As illustrated in FIG. 7, in a top plan view, the annular-shaped output portion 13e is formed along an imaginary plane (second imaginary plane) $F_{13e}$, which is inclined with respect to the tubular axis $Ax_{13}$ of the perimeter portion 13b. In other words, when a normal line $Ax_{13e}$ orthogonal to the imaginary plane $F_{13e}$ is defined, based on an intersection point P2 with respect to the tubular axis $Ax_{13}$ within the imaginary plane $F_{13e}$, which is inclined with respect to the tubular axis $Ax_{13}$, the tubular axis $Ax_{13}$ and the normal line $Ax_{13e}$ intersect with each other with an angle $\theta_2$, which is an acute angle smaller than 90°. In the output portion 13e of the outer glass 13 configured as described above, a middle end portion in a vehicle width direction is located at a position closer to the front side of the vehicle 1 with respect to a lateral end portion in a vehicle width direction.

Herein, as illustrated in FIG. 7, the normal line $Ax_{12}$ and the normal line $Ax_{13e}$ are inclined in a same direction with respect to the tubular axis $Ax_{13}$. In the present embodiment, as an example, the angle $\theta_1$ and the angle $\theta_2$ satisfy a relationship as expressed by the following mathematical expression.

$$\theta_1 \geq \theta_2 \quad \text{(Expression 1)}$$

Likewise, when a normal line $Ax_{1d}$ is defined, based on an intersection point P3 with respect to the tubular axis $Ax_{13}$ inside a vehicular front end portion 1d, the normal line $Ax_{1d}$ has an angle $\theta_3$ with respect to the tubular axis $Ax_{13}$. Further, the normal line $Ax_{1d}$ is also inclined in the same direction as the normal line $Ax_{12}$ and the normal line $Ax_{13e}$ with respect to the tubular axis $Ax_{13}$.

7. Shape of Recess Portion 1b and Layout Pattern of Light Guide 12

A relationship between a shape of the recess portion 1b and a layout pattern of the light guide 12 is described with reference to FIG. 8. FIG. 8 is a schematic side view of a periphery of the recess portion 1b of the vehicular front portion 1a, when viewed from a side of the vehicle 1.

As illustrated in FIG. 8, when the vehicular front portion 1a is viewed from a side of the vehicle 1, the recess portion 1b has an elongated shape from the vehicular front end portion 1d toward the vehicular side portion 1c. Further, a part of a front portion of the illumination device 2 is made visible, when the vehicular front portion 1a is viewed from a side of the vehicle 1.

As illustrated by an enlarged portion in FIG. 8, a plurality of slits 16a are formed in a peripheral direction of the outer case 16 of the illumination device 2. When the vehicular front portion 1a is viewed from a side of the vehicle 1, a part of the plurality of slits 16a are visible through an opening of the recess portion 1b. Further, when the headlight 5 or the second light source portion 8 is driven to emit light, a part of light from the perimeter portion 13b of the outer glass 13 is output laterally through the slits 16a.

In the illumination device 2, a rear portion 18a of the housing 18 has a large diameter, as compared with a front portion of the housing 18. This is because the light guide 12 is disposed in such a way as to surround a periphery of the headlight 5, a rear portion of the outer glass 13 for accommodating the light guide 12 has a large diameter, and the outer case 16 is formed in such a way as to cover an outer periphery of the large diametrical portion. As illustrated by an enlarged portion in FIG. 8, in the illumination device 2 according to the present embodiment, since the light guide 12 is disposed with an inclination in such a way that the lateral end portion 12c of the light guide 12 in a vehicle width direction is disposed on the rear side of the vehicle 1, the rear portion 18a (large diametrical portion) of the housing 18 is made invisible through an opening of the recess portion 1b in a side view.

8 Configuration of Reflecting Portion 12a of Light Guide 12

Figure 10A:
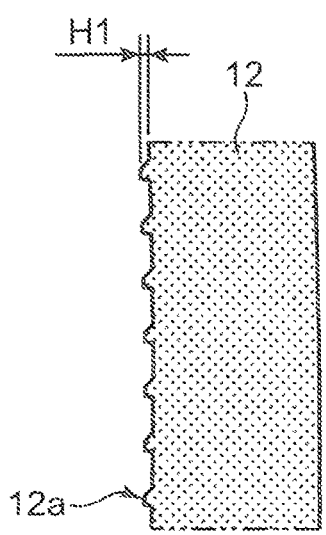
FIG. 10A is a schematic cross-sectional view illustrating a cross-sectional configuration of a portion B in FIG. 9.
Figure 10B:
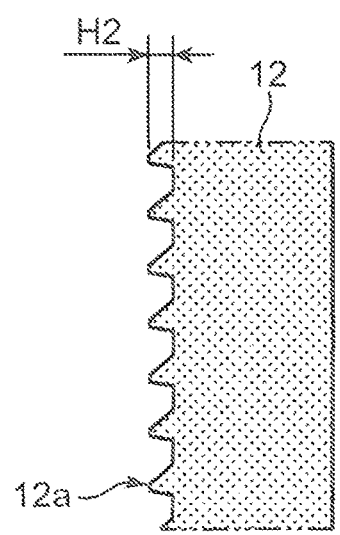
FIG. 10B is a schematic cross-sectional view illustrating a cross-sectional configuration of a portion C in FIG. 9.
Figure 10C:
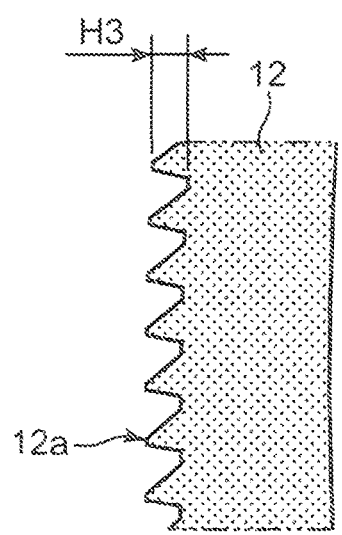
FIG. 10C is a schematic cross-sectional view illustrating a cross-sectional configuration of a portion D in FIG. 9.

A configuration of a reflecting portion 12a of the light guide 12 is described with reference to FIGS. 9 to 10C. FIG. 9 is a schematic rear view illustrating a configuration of the light guide 12, when viewed from a rear side. FIG. 10A is a schematic cross-sectional view illustrating a cross-sectional configuration of a portion B in FIG. 9. FIG. 10B is a schematic cross-sectional view illustrating a cross-sectional configuration of a portion C in FIG. 9. FIG. 10C is a schematic cross-sectional view illustrating a cross-sectional configuration of a portion D in FIG. 9.

As illustrated in FIG. 9, the reflecting portion 12a having a convexo-concave shape is formed on a back surface portion of the light guide 12 in the present embodiment along a circumferential direction.

As illustrated in FIG. 10A, a convexo-concave height of the reflecting portion 12a is H1 at a portion B, which is proximate to a connecting portion between the first branch portion 11a and the second branch portion 11b. Further, as illustrated in FIG. 10B, a convexo-concave height of the reflecting portion 12a is H2 at a portion C, which is away from the connecting portion, and as illustrated in FIG. 10C, a convexo-concave height of the reflecting portion 12a is H3 at a portion D, which is further away from the connecting portion. H1, H2, and H3 satisfy the following relationship.

$$H1 < H2 < H3 \quad \text{(Expression 2)}$$

Note that, as an example, H2 may be two to three times as high as H1, and H3 may be three to four times as high as H1.

In the light guide 12 in the present embodiment, forming the reflecting portion 12a whose convexo-concave height is gradually changed in a circumferential direction on a back surface portion enables to substantially uniformly adjust an intensity of light to be output forwardly (toward the incident portion 13d of the outer glass 13) in a circumferential direction of the light guide 12.

9. Advantageous Effects

In the illumination device 2 according to the present embodiment, since the annular-shaped light guide 12 is disposed along the imaginary plane $F_{12}$, which is inclined with the angle $\theta_1$ with respect to the tubular axis $Ax_{13}$ of the perimeter portion 13b of the outer glass 13, it is possible to design the vehicle 1 with enhanced design.

In the vehicular front portion 1a according to the present embodiment, the illumination device 2 is disposed on the inner side of the elongated recess portion 1b, which extends from the vehicular front end portion 1d toward the vehicular side portion 1c. As described with reference to FIG. 8, the rear portion 18a (a portion where the light guide 12 is accommodated) of the housing 18 of the illumination device 2 is made invisible from a side of the vehicle 1. Therefore, in designing the vehicular front portion 1a, it is possible to achieve a high degree of freedom in designing the vehicle 1 having enhanced design by making the rear portion 18a of the housing 18 for accommodating the light guide 12 invisible from a side of the vehicle 1.

Further, as illustrated in FIG. 7, in the illumination device 2 according to the present embodiment, since, in a top plan view of the vehicle 1, the middle end portion 12b of the light guide 12 in a vehicle width direction is disposed at a position closer to the front side with respect to the lateral end portion 12c in the vehicle width direction, an inclination direction of the light guide 12 coincides with an inclination direction of the vehicular front end portion 1d. Specifically, in a top plan view, as illustrated in FIG. 7, the vehicular front end portion 1d of the vehicle 1 is configured such that a middle portion thereof in a vehicle width direction protrudes forwardly than a lateral portion thereof in the vehicle width direction. In the illumination device 2, as described with reference to FIG. 8, aligning an inclination direction of the light guide 12 with an inclination direction of the vehicular front end portion 1d enables to securely make the rear portion 18a of the housing 18 for accommodating the light guide 12 invisible, even when the vehicular front portion 1a is viewed from a side of the vehicle 1.

Further, in the illumination device 2 according to the present embodiment, since light from the light guide 12 is incident to the perimeter portion 13b of the outer glass 13, and is output forwardly of the vehicle 1 from the output portion 13e, light output from the light guide 12 is radiated forwardly of the vehicle 1 with high efficiency.

Furthermore, in the illumination device 2, since the output portion 13e is formed along the imaginary plane $F_{13e}$, which is inclined with the angle $\theta_2$ with respect to the tubular axis $Ax_{13}$ of the perimeter portion 13b, it is possible to suppress the output portion 13e of the outer glass 13 from projecting forwardly with respect to an exterior member on the vehicular front end portion 1d. Thus, it is possible to design the vehicular front portion 1a with enhanced design.

Moreover, in the illumination device 2 according to the present embodiment, as illustrated in FIG. 7, since a middle end portion of the output portion 13e of the outer glass 13 is disposed at a position closer to the front side with respect to a lateral end portion thereof, it is possible to design the vehicular front portion 1a with enhanced design by aligning an inclination direction of the output portion 13e of the outer glass 13 with an inclination direction of the vehicular front end portion 1d.

Also, in the illumination device 2 according to the present embodiment, since a front portion of a connecting portion between the light guide 12, and each of the first branch portion 11a and the second branch portion 11b of the light guide 11 is covered by the distal end portion 3a of the signature wing 3, even when light emission fluctuates on each of the connecting portions, light is made invisible from the outside (from the front side of the vehicle 1) by covering the front portion of the connecting portions by the distal end portion 3a of the signature wing 3.

Further, in the illumination device 2 according to the present embodiment, since the light guide 9 extends forwardly of the vehicle 1, and light from the light guide 9 is incident to the light guide 12, it is possible to output light from the light guide 12 with high efficiency by aligning an extending direction of the light guide 9 and an output direction of light from the light guide 12 with an output direction of light from the second light source portion 8.

Furthermore, in the illumination device 2, covering a front portion of a connecting portion between the light guide 12, and each of the first branch portion 11a and the second branch portion 11b by the distal end portion 3a of the signature wing 3 enables to suppress a structure of the connecting portions from being visible from a front side, when the illumination device 2 is viewed from the front side. Thus, it is possible to achieve enhanced design.

Moreover, the illumination device 2 according to the present embodiment includes the light guide 10 extending in a vehicle width direction along a front end portion of the signature wing 3, and light is also output from the light guide 10, when the second light source portion 8 is driven to emit light. Therefore, in the illumination device 2, light is output from both of the light guide 12 in a periphery of the headlight 5, and the light guide 10 on the outside the outer glass 13, when the second light source portion 8 as one light source portion is driven to emit light. This enables to achieve enhanced design, while reducing the weight and the production cost of the vehicle 1.

Also, in the illumination device 2 according to the present embodiment, since light is guided from the light guide 9 extending forwardly of the vehicle 1 from the light guide 10 disposed on the signature wing 3, it is possible to emit light from the second light source portion 8 also from the light guide 10 forwardly of the vehicle 1 with high efficiency by aligning a light propagating direction through the light guide 9 and an output direction of light from the light guide 10 on the front side.

Further, since the interposing portion 13*a* of the outer glass 13 is interposed between the light guide 9 and the light guide 10, it is possible to suppress intrusion of moisture and dust into the light chamber 2*a* at least from the front side of the vehicle 1. This is advantageous in securing high reliability.

As described above, in the illumination device 2 according to the present embodiment, it is possible to increase a degree of design freedom in designing the vehicle 1 having enhanced design.

Modifications

In the illumination device 2 according to the embodiment, two light emitting portions, namely, the annular light emitting portion 6 constituted by the light guide 12 disposed to surround the periphery of the headlight 5, and the wing light emitting portion 4 constituted by the light guide 10 extending linearly and inwardly in a vehicle width direction along a front end portion of the signature wing 3 are employed, as light emitting portions mounted on the headlight 5. The present invention, however, is not limited to the above. For example, it may be possible to employ a configuration in which both of two light emitting portions are light emitting portions extending in a vehicle width direction. Further, it may be possible to employ a configuration in which a plurality of dot-shaped light emitting portions are mounted on a headlight.

In the illumination device 2 according to the embodiment, the light guide 12 is disposed along the imaginary plane $F_{12}$, and the output portion 13*e* of the outer glass 13 is formed along the imaginary plane $F_{13e}$. The present invention, however, is not limited to the above. For example, a light guide may be disposed along an imaginary curve, and an output portion of an outer glass may also be disposed along an imaginary curve.

In the illumination device 2 according to the embodiment, light from the light guide 12 disposed in such a way as to surround a periphery of the headlight 5 is guided inside the perimeter portion 13*b* of the outer glass 13, and light is output forwardly from the output portion 13*e*. The present invention, however, is not limited to the above. For example, light output from a light guide 12 may be directly and forwardly output through a front surface portion 13*c* of an outer glass 13.

In the illumination device 2 according to the embodiment, a light source portion constituted by one or more LED elements is employed as the second light source portion 8 including the annular light emitting portion 6 and the wing light emitting portion 4. The present invention, however, is not limited to the above. For example, it may be possible to employ an organic EL element, an inorganic EL element, a semiconductor laser element, or the like, as a second light source portion.

In the illumination device 2 according to the embodiment, when light is output by driving the second light source portion 8, both of the annular light emitting portion 6 and the wing light emitting portion 4 are caused to emit light. The present invention, however, is not limited to the above. For example, an optical shutter may be provided between a second light source portion and a first light guide, and between the second light source portion and a fourth light guide, so that two light emitting portions are selectively caused to emit light.

In the illumination device 2 according to the embodiment, a light source of the headlight 5 is not specifically mentioned. Various types of light sources, however, may be employed. For example, an LED, an inorganic EL element and an organic EL element, or a semiconductor light emitting element such as a semiconductor laser element may be employed. Further, a halogen lamp, a high intensity discharge lamp, or the like may be employed.

In the illumination device 2 according to the embodiment, a wavelength of light to be output from the second light source portion 8 is not specifically mentioned. However, it may be configured to output only light of a predetermined wavelength (e.g., a wavelength of light of an orange color). Further, it may be configured to output light having wavelengths different from each other (e.g. a wavelength of light having a white color, and a wavelength of light having an orange color) by adjusting an application voltage or the like.

Further, it may be configured to intermittently output light from a second light source portion, or cause a plurality of light emitting portions or a part of light emitting portions to blink light.

A vehicular illumination device described in relation to the embodiment mainly includes the following features.

A vehicular illumination device according to the embodiment is a vehicular illumination device provided on a front portion of a vehicle. The illumination device includes: a headlight as a first light source portion operative to radiate light forwardly of the vehicle; an outer glass including a front surface portion for covering a front portion of the headlight and a tubular-shaped perimeter portion for covering a periphery of the headlight; a second light source portion provided separately of the headlight; and a light guide having an annular shape in such a way as to surround a periphery of the headlight, and configured to allow incidence of light output from the second light source portion and output the incident light while guiding the incident light. The light guide is disposed along an imaginary plane inclined with respect to a tubular axis of the perimeter portion of the outer glass.

In a vehicular illumination device according to this aspect, since the light guide is disposed along the imaginary plane inclined with respect to the tubular axis of the perimeter portion of the outer glass, it is possible to design a vehicle having enhanced design. Specifically, in a vehicle, an illumination device is disposed on a vehicular front portion. Disposing a light guide along an imaginary plane inclined with respect to a tubular axis of a perimeter portion of an outer glass enables to dispose a light guide of an illumination device in conformity with a design of the vehicular front portion. Therefore, it is possible to make a portion of an outer glass for accommodating a light guide invisible from a side of the vehicle in terms of a relationship with design of a vehicular front portion. Thus, it is possible to increase a degree of freedom in vehicle designing.

Further, in the above-described vehicular illumination device, since the light guide surrounds a periphery of the headlight, and the annular-shaped light guide is disposed to face the front side of the vehicle, it is possible to output light from the light guide forwardly of the vehicle with high efficiency.

In the vehicular illumination device according to this aspect, in a top plan view of the light guide, a middle end portion of the light guide in a width direction of the vehicle may be disposed at a position closer to a front side with respect to a lateral end portion of the light guide in the vehicle width direction.

In a case where the above configuration is employed, since the middle end portion of the light guide in a vehicle width direction is disposed at a position closer to the front side with respect to the lateral end portion in the vehicle width direction, an inclination direction of the middle end portion coincides with an inclination direction of a front end portion of the vehicle. Specifically, in a plan view, a front end portion of the vehicle is configured such that a middle portion in a vehicle width direction protrudes forwardly with respect to a lateral portion thereof. In the vehicular illumination device according to this aspect, aligning an inclination direction of the light guide with an inclination direction of a front end portion of the vehicle enables to suppress a portion for accommodating the light guide from being visible from outside, even when the vehicular front portion is viewed from a side of the vehicle.

In the vehicular illumination device according to this aspect, the perimeter portion may include an annular-shaped incident portion formed on a middle portion thereof in a tubular axis direction and configured to allow incidence of light output from the light guide, and an output portion formed on a front end portion thereof in the tubular axis direction and configured to output light incident to the incident portion and guided inside the perimeter portion forwardly in a periphery of the front surface portion. The output portion may have an annular shape in such a way to surround a periphery of the front surface portion. When it is assumed that the imaginary plane along which the light guide is formed is a first imaginary plane, the output portion may be formed along a second imaginary plane inclined with respect to a tubular axis of the perimeter portion of the outer glass.

In a case where the above configuration is employed, since light from the light guide is incident to the perimeter portion of the outer glass, and is output forwardly of the vehicle from the output portion, light output from the light guide is radiated forwardly of the vehicle.

Further, in the above configuration, since the output portion is formed along the second imaginary plane inclined with respect to the tubular axis, it is possible to suppress the output portion of the outer glass from projecting forwardly with respect to an exterior member on a vehicular front portion. This is advantageous in designing a vehicle with enhanced design.

In the vehicular illumination device according to this aspect, in a top plan view of the perimeter portion, a middle end portion of the output portion in a width direction of the vehicle may be disposed at a position closer to a front side with respect to a lateral end portion thereof in the vehicle width direction.

In a case where the above configuration is employed, since the middle end portion of the output portion in a vehicle width direction is disposed at a position closer to the front side with respect to the lateral end portion in the vehicle width direction, this is advantageous in designing a vehicular front portion with enhanced design by aligning an inclination direction of the output portion of the outer glass with an inclination direction of the front end portion of the vehicle.

In the vehicular illumination device according to this aspect, when it is assumed that the light guide is a first light guide, the vehicular illumination device may further include: a second light guide formed to extend forwardly of the vehicle from a portion where the second light source portion is disposed, and configured to guide light output from the second light source portion; a third light guide disposed between the second light guide and the first light guide, and configured to guide a part of light guided through the second light guide to the first light guide; and an exterior member disposed adjacent to a part of the outer glass on a front portion of the vehicle, and formed to extend forwardly of the vehicle with respect to the outer glass. The third light guide may include a first branch portion for guiding light toward one side of the first light guide in a circumferential direction, and a second branch portion for guiding light toward the other side of the first light guide in the circumferential direction. A front portion of the vehicle associated with a connecting portion between the first light guide and each of the first branch portion and the second branch portion may be covered by a part of the exterior member.

In a case where the above configuration is employed, since the front portion of the connecting portion between the first light guide and each of the first branch portion and the second branch portion is covered by a part of the exterior member, even when light emission fluctuates on each of the connecting portions, light is made invisible from the outside (from the front side of the vehicle) by covering the front portion of the connecting portions by the part of the exterior member.

Further, in a case where the above configuration is employed, since the front portion of the connecting portion between the first light guide and each of the first branch portion and the second branch portion is covered by a part of the exterior member, it is possible to suppress a structure of the connecting portions from being visible, when the illumination device is viewed from the front side of the vehicle. Thus, it is possible to achieve enhanced design.

Furthermore, in a case where the above configuration is employed, since the second light guide extends forwardly of the vehicle, and light guided through the second light guide is incident to the first light guide, it is possible to output light from the second light source portion forwardly of the vehicle with enhanced efficiency by aligning a light propagating direction through the second light guide and an output direction of light from the first light guide on the front side.

The vehicular illumination device according to this aspect may further include a fourth light guide formed to extend in a width direction of the vehicle along a front end portion of the exterior member on an outside the outer glass, and configured to allow incidence of a remaining part of light guided through the second light guide via the outer glass and output the incident light, while guiding the incident light.

In a case where the above configuration is employed, the vehicular illumination device further includes the fourth light guide extending in the vehicle width direction along the front end portion of the exterior member, and the fourth light guide also outputs light, when the second light source portion is driven to emit light. Therefore, in a case where the above configuration is employed, light is output from two light emitting portions, namely, the first light guide and the second light guide, when the second light source portion as one light source portion is driven to emit light. Thus, it is possible to achieve enhanced design, while reducing the weight and the production cost of the vehicle.

Further, in a case where the above configuration is employed, since light is guided to the fourth light guide from the second light guide extending forwardly of the vehicle, it is possible to output light from the second light source portion forwardly of the vehicle also from the fourth light guide with high efficiency by aligning a light propagating direction through the second light guide and an output direction of light from the fourth light guide on the front side.

Further, since the outer glass is interposed between the second light guide and the fourth light guide, it is possible to suppress intrusion of moisture and dust into a light chamber (into an outer glass) at least from the front side of the vehicle. This is advantageous in securing high reliability.

In the vehicular illumination device according to this aspect, it is possible to increase a degree of design freedom in designing a vehicle having enhanced design.

This application is based on Japanese Patent application No. 2018-147457 filed in Japan Patent Office on Aug. 6, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicular illumination device provided on a front portion of a vehicle, comprising:
   a headlight as a first light source portion operative to radiate light forwardly of the vehicle;
   an outer glass including a front surface portion for covering a front portion of the headlight and a tubular-shaped perimeter portion for covering a periphery of the headlight;
   a second light source portion provided separately of the headlight; and
   a light guide having an annular shape in such a way as to surround a periphery of the headlight, and configured to allow incidence of light from the second light source portion, guiding the light, and output of the light, wherein
   the light guide is disposed along an imaginary plane inclined with respect to a tubular axis of the perimeter portion of the outer glass, wherein
   the tubular perimeter portion includes an annular-shaped incident portion formed on a middle portion of the tubular perimeter portion in a tubular axis direction of the tubular perimeter portion and configured to allow incidence of light output from the light guide, and an output portion formed on a front end portion of the tubular perimeter portion in the tubular axis direction and configured to output light incident to the incident portion and guided inside the perimeter portion forwardly in a periphery of the front surface portion,
   the output portion has an annular shape so that the output portion surrounds a periphery of the front surface portion, and
   when the imaginary plane along which the light guide is formed is a first imaginary plane, the output portion is formed along a second imaginary plane inclined with respect to a tubular axis of the perimeter portion of the outer glass.

2. The vehicular illumination device according to claim 1, wherein
   in a top plan view of the tubular perimeter portion, a first end portion of the output portion which is located at a middle side in a width direction of the vehicle is disposed at a position closer to a front side with respect to a second end portion thereof which is located at a lateral side in the vehicle width direction.

3. A vehicular illumination device provided on a front portion of a vehicle, comprising:
   a headlight as a first light source portion operative to radiate light forwardly of the vehicle;
   an outer glass including a front surface portion for covering a front portion of the headlight and a tubular-shaped perimeter portion for covering a periphery of the headlight;
   a second light source portion provided separately of the headlight; and
   a light guide having an annular shape in such a way as to surround a periphery of the headlight, and configured to allow incidence of light from the second light source portion, guiding the light, and output of the light, wherein
   the light guide is disposed along an imaginary plane inclined with respect to a tubular axis of the perimeter portion of the outer glass, wherein
   when the light guide is a first light guide,
   the vehicular illumination device further comprises:
   a second light guide formed to extend forwardly of the vehicle and to extend from a portion where the second light source portion is disposed, and configured to guide light output from the second light source portion;
   a third light guide disposed between the second light guide and the first light guide, and configured to guide a part of light guided through the second light guide to the first light guide; and
   an exterior member disposed adjacent to a part of the outer glass on a front portion of the vehicle, and formed to extend forwardly of the outer glass, wherein
   the third light guide includes a first branch portion for guiding light toward one side of the first light guide in a circumferential direction, and a second branch portion for guiding light toward the other side of the first light guide in the circumferential direction, and
   a front portion of a connecting portion between the first light guide and each of the first branch portion and the second branch portion is covered by a part of the exterior member.

4. The vehicular illumination device according to claim 3, further comprising
   a fourth light guide formed to extend in a width direction of the vehicle and to extend along a front end portion of the exterior member on an outside the outer glass, and configured to allow incidence of a remaining part of light through the second light guide via the outer glass, guiding the remaining light, and output the remaining light.

5. A vehicular illumination device provided on a front portion of a vehicle, comprising:
   a headlight as a first light source portion operative to radiate light forwardly of the vehicle;
   an outer glass including a front surface portion for covering a front portion of the headlight and a tubular-shaped perimeter portion for covering a periphery of the headlight;
   a second light source portion provided separately of the headlight; and
   a light guide having an annular shape in such a way as to surround a periphery of the headlight, and configured to allow incidence of light from the second light source portion, guiding the light, and output of the light, wherein
   the light guide is disposed along an imaginary plane inclined with respect to a tubular axis of the perimeter portion of the outer glass, wherein in a top plan view of the light guide, a first end portion of the light guide which is located at a middle side in a width direction of the vehicle is disposed at a position closer to a front side with respect to a second end portion of the light guide which is located at a lateral side in the vehicle width direction, wherein the tubular perimeter portion includes an annular-shaped incident portion formed on a middle portion of the tubular perimeter portion in a tubular axis direction of the tubular perimeter portion and configured to allow incidence of light output from the light guide, and an output portion formed on a front end portion of the tubular perimeter portion in the tubular axis direction and configured to output light incident to the incident portion and guided inside the perimeter portion forwardly in a periphery of the front surface portion, the output portion has an annular shape so that the output portion surrounds a periphery of the front surface portion, and when the imaginary plane along which the light guide is formed is a first imaginary plane, the output portion is formed along a second imaginary plane inclined with respect to a tubular axis of the perimeter portion of the outer glass.

6. A vehicular illumination device provided on a front portion of a vehicle, comprising:
   a headlight as a first light source portion operative to radiate light forwardly of the vehicle;
   an outer glass including a front surface portion for covering a front portion of the headlight and a tubular-shaped perimeter portion for covering a periphery of the headlight;
   a second light source portion provided separately of the headlight; and
   a light guide having an annular shape in such a way as to surround a periphery of the headlight, and configured to allow incidence of light from the second light source portion, guiding the light, and output of the light, wherein
   the light guide is disposed along an imaginary plane inclined with respect to a tubular axis of the perimeter portion of the outer glass, wherein
   in a top plan view of the light guide, a first end portion of the light guide which is located at a middle side in a width direction of the vehicle is disposed at a position closer to a front side with respect to a second end portion of the light guide which is located at a lateral side in the vehicle width direction, wherein
   when the light guide is a first light guide,
   the vehicular illumination device further comprises:
   a second light guide formed to extend forwardly of the vehicle and to extend from a portion where the second light source portion is disposed, and configured to guide light output from the second light source portion;
   a third light guide disposed between the second light guide and the first light guide, and configured to guide a part of light guided through the second light guide to the first light guide; and
   an exterior member disposed adjacent to a part of the outer glass on a front portion of the vehicle, and formed to extend forwardly of the outer glass, wherein
   the third light guide includes a first branch portion for guiding light toward one side of the first light guide in a circumferential direction, and a second branch portion for guiding light toward the other side of the first light guide in the circumferential direction, and
   a front portion of a connecting portion between the first light guide and each of the first branch portion and the second branch portion is covered by a part of the exterior member.

7. The vehicular illumination device according to claim 1, wherein
   when it is assumed that the light guide is a first light guide, the vehicular illumination device further comprises:
   a second light guide formed to extend forwardly of the vehicle and to extend from a portion where the second light source portion is disposed, and configured to guide light output from the second light source portion;
   a third light guide disposed between the second light guide and the first light guide, and configured to guide a part of light guided through the second light guide to the first light guide; and
   an exterior member disposed adjacent to a part of the outer glass on a front portion of the vehicle, and formed to extend forwardly of the outer glass, wherein
   the third light guide includes a first branch portion for guiding light toward one side of the first light guide in a circumferential direction, and a second branch portion for guiding light toward the other side of the first light guide in the circumferential direction, and
   a front portion of the vehicle associated with a connecting portion between the first light guide and each of the first branch portion and the second branch portion is covered by a part of the exterior member.

8. The vehicular illumination device according to claim 2, wherein
   when the light guide is a first light guide,
   the vehicular illumination device further comprises:
   a second light guide formed to extend forwardly of the vehicle and to extend from a portion where the second light source portion is disposed, and configured to guide light output from the second light source portion;
   a third light guide disposed between the second light guide and the first light guide, and configured to guide a part of light guided through the second light guide to the first light guide; and
   an exterior member disposed adjacent to a part of the outer glass on a front portion of the vehicle, and formed to extend forwardly of the outer glass, wherein
   the third light guide includes a first branch portion for guiding light toward one side of the first light guide in a circumferential direction, and a second branch portion for guiding light toward the other side of the first light guide in the circumferential direction, and
   a front portion of a connecting portion between the first light guide and each of the first branch portion and the second branch portion is covered by a part of the exterior member.

* * * * *